(12) United States Patent
Fichou et al.

(10) Patent No.: US 11,564,122 B2
(45) Date of Patent: Jan. 24, 2023

(54) GRADE OF SERVICE CONTROL CLOSED LOOP

(71) Applicant: AT&T Intellectual Property I, L.P., Atlanta, GA (US)

(72) Inventors: Aline Fichou, La Colle sur Loup (FR); Aurelien Bruno, Colomars (FR); Diana Toll, Robbinsville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/778,029

(22) Filed: Jan. 31, 2020

(65) Prior Publication Data

US 2020/0169911 A1 May 28, 2020

Related U.S. Application Data

(63) Continuation of application No. 15/489,152, filed on Apr. 17, 2017, now Pat. No. 10,595,223, which is a
(Continued)

(51) Int. Cl.
*H04W 28/02* (2009.01)
*H04W 24/00* (2009.01)
(Continued)

(52) U.S. Cl.
CPC ......... *H04W 28/0263* (2013.01); *H04L 12/46* (2013.01); *H04L 12/4641* (2013.01); *H04L 12/4675* (2013.01); *H04L 12/6418* (2013.01); *H04L 41/5009* (2013.01); *H04L 43/0894* (2013.01); *H04L 43/16* (2013.01); *H04L 43/50* (2013.01); *H04L 45/50* (2013.01); *H04L 47/10* (2013.01); *H04L 47/32* (2013.01); *H04L 63/0272* (2013.01); *H04L 67/01* (2022.05); *H04L 67/10* (2013.01); *H04L 67/535* (2022.05); *H04L 69/22* (2013.01); *H04W 24/00* (2013.01); *H04W 28/0289* (2013.01); *H04W 28/22* (2013.01)

(58) Field of Classification Search
CPC ......... H04L 43/16; H04L 47/32; H04L 47/10; H04L 2012/5651; H04W 28/22
See application file for complete search history.

(56) References Cited

U.S. PATENT DOCUMENTS

| | | | |
|---|---|---|---|
| 5,434,848 A | * | 7/1995 | Chimento, Jr. ..... H04L 12/5602 370/232 |
| 5,982,412 A | | 11/1999 | Nulty |

(Continued)

OTHER PUBLICATIONS

Junos OS 10.4 Release Notes; Notes accompanying Release 10.4R16 of the Junos operating system; released Dec. 3, 2013, 428 pages; located at http://juniper.net/techpubs/software/junos.

*Primary Examiner* — Raj Jain
(74) *Attorney, Agent, or Firm* — Guntin & Gust, PLC; Jay Anderson

(57) ABSTRACT

Systems and methods for managing network traffic receives, at a grade of service device, network traffic information for a plurality of network traffic channels from a network device separate from the grade of service device. The network traffic information is compared to a threshold to determine a behavior value for each network traffic channel. Each network traffic channel is mapped to a grade of service according to the behavior value.

20 Claims, 5 Drawing Sheets

Related U.S. Application Data continuation of application No. 14/283,317, filed on May 21, 2014, now Pat. No. 9,654,305.

(51) Int. Cl.

| | |
|---|---|
| *H04W 28/22* | (2009.01) |
| *H04L 69/22* | (2022.01) |
| *H04L 43/0894* | (2022.01) |
| *H04L 43/16* | (2022.01) |
| *H04L 67/01* | (2022.01) |
| *H04L 67/50* | (2022.01) |
| *H04L 47/10* | (2022.01) |
| *H04L 12/46* | (2006.01) |
| *H04L 45/50* | (2022.01) |
| *H04L 47/32* | (2022.01) |
| *H04L 12/64* | (2006.01) |
| *H04L 41/5009* | (2022.01) |
| *H04L 67/10* | (2022.01) |
| *H04L 9/40* | (2022.01) |
| *H04L 43/50* | (2022.01) |

(56) References Cited

U.S. PATENT DOCUMENTS

| | | | |
|---|---|---|---|
| 6,597,923 B1 * | 7/2003 | Vanghi | H04W 52/12 |
| | | | 370/342 |
| 7,006,440 B2 | 2/2006 | Agrawal et al. | |
| 7,006,472 B1 | 2/2006 | Immonen et al. | |
| 7,061,919 B1 | 6/2006 | Anschutz | |
| 7,257,121 B2 | 8/2007 | Kuhl et al. | |
| 7,519,727 B2 | 4/2009 | Wiryaman et al. | |
| 7,830,816 B1 | 11/2010 | Gonzalez et al. | |
| 7,894,344 B2 | 2/2011 | Sankey et al. | |
| 7,987,228 B2 | 7/2011 | McKeown et al. | |
| 8,532,124 B2 | 9/2013 | Satterlee et al. | |
| 2005/0089054 A1 | 4/2005 | Ciancaglini et al. | |
| 2005/0174965 A1 * | 8/2005 | Sarkkinen | H04L 47/824 |
| | | | 370/329 |
| 2006/0101144 A1 | 5/2006 | Wiryaman et al. | |
| 2006/0146876 A1 | 7/2006 | Kim et al. | |
| 2012/0005347 A1 | 1/2012 | Chen et al. | |
| 2012/0151057 A1 | 6/2012 | Paredes et al. | |
| 2012/0263457 A1 * | 10/2012 | Mahlab | H04B 10/0795 |
| | | | 398/25 |
| 2013/0003538 A1 | 1/2013 | Greenberg et al. | |
| 2013/0346493 A1 | 12/2013 | Martin | |
| 2015/0341188 A1 | 11/2015 | Fichou et al. | |
| 2017/0223567 A1 * | 8/2017 | Fichou | H04L 67/42 |
| 2020/0169911 A1 * | 5/2020 | Fichou | H04L 67/42 |

\* cited by examiner

GRADE OF SERVICE CONTROL CLOSED LOOP

CROSS-REFERENCE TO RELATED APPLICATIONS

This application is a continuation of U.S. patent application Ser. No. 15/489,152, filed Apr. 17, 2017, which is a continuation of U.S. patent application Ser. No. 14/283,317, filed May 21, 2014, now U.S. Pat. No. 9,654,305, the disclosures of which are incorporated by reference herein in their entirety.

BACKGROUND

The present disclosure generally relates to grade of service, and more particularly to a grade of service control closed loop.

Grade of Service is typically implemented using Classes of Service in hardware, for example in networking devices such as a router or switch. However, class of service implementations vary depending on the vendor of the hardware. Specifically, depending on the hardware chosen and the type of services offered (e.g., managed router service, virtual private network, cloud services, etc.), different hardware devices are used. However, each hardware device has its own limitations and capabilities that is to be considered in defining the class of service behavior and the underlying service.

BRIEF SUMMARY

The present disclosure relates to a system and method for managing network traffic by implementing grade of service in a device separate from the network device.

In one embodiment, grade of service is implemented on a grade of service device separate from the network device to thereby move the complexity from hardware of the network devices to software based mechanisms, de-correlating the data path from the control path. Network traffic information for a plurality of network traffic channels is received at a grade of service device from the network device. The network traffic information may be received from the network device at regular intervals of time and/or may be received in response to a network event, such as, e.g., a threshold reached in a queue, a packet discard, etc.

The network traffic information is compared to a threshold to determine a behavior value for each network traffic channel. In one embodiment, network traffic information for a previous iteration of time is compared with the threshold. The number of iterations Y may be determined by the user. This insures at least Y iterations of "bad" polling before modifying the traffic behavior. For example, traffic behavior can be modified by moving it to a lower grade of service, increasing the port available bandwidth, dropping the traffic, etc.

Each network traffic channel is mapped to a grade of service according to the behavior value. Mapping may include changing an experimental bit field in the multiprotocol label switching header. Mapping may also include changing a differentiated services field in an internet protocol header. The network traffic may be transmitted by the network device according to the grade of service. Each port of the network device may include one or more queues to queue traffic before transmitting. One or more thresholds on each queue are employed to discard traffic based on the grade of service.

Methods, apparatuses and computer readable mediums for managing network traffic are disclosed herein.

DETAILED DESCRIPTION

Figure 1:
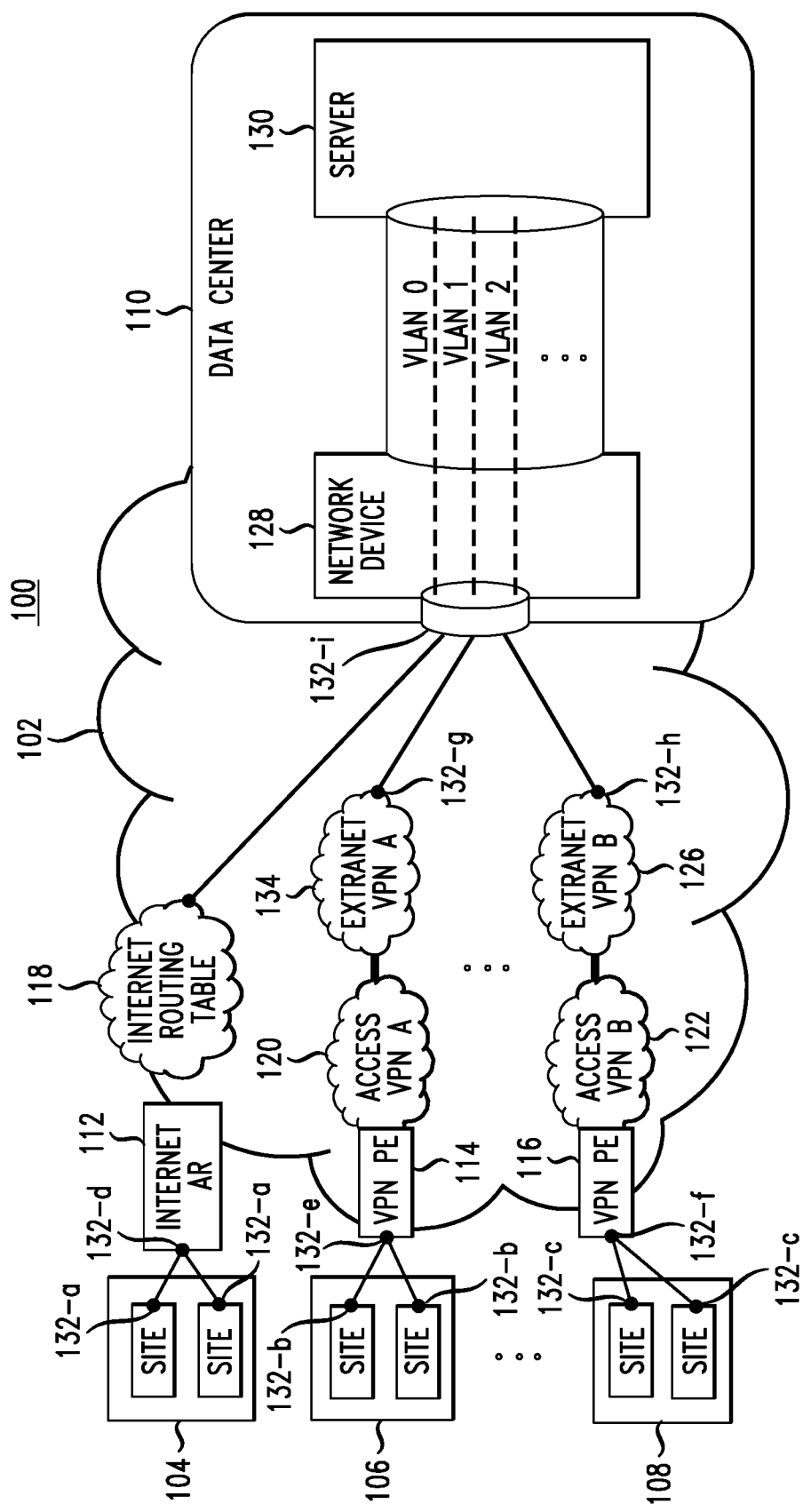
FIG. 1 shows an exemplary high-level cloud computing architecture for accessing a server in a data center, in accordance with one or more embodiments.

FIG. 1 shows an illustrative high-level system 100 having a cloud computing architecture for accessing a server in a data center. A user (e.g., customer, partner, etc.) interacts with a website to access data stored in server 130 in data center 110 over network 102, which may include the internet, a private network, a public network, etc. The website may include, e.g., internet-based sites 104, customer A virtual private network (VPN) sites 106, customer B VPN sites 108, etc.

A user connects to network 102 via a website to access server 130. For example, a user interacting with internet-based site 104 connects to internet routing table 118 in network 102 using internet attachment router (AR) device 112. In another example, a user interacting with customer A VPN site 106 connects to VPN A 120 and Extranet VPN A 124 in network 102 using VPN provider edge (PE) device 114. In another example, a user interacting with customer B VPN site 108 connects to VPN B 122 and Extranet VPN B 126 in network 102 using VPN PE device 116. Other implementations are also contemplated.

The user accesses server 130 in data center 110 through network device 128, which may include a router, switch or other network element. Network device 128 transmits traffic to server 130 over network traffic channels, such as, e.g., virtual local area networks (VLANs), VPNs, applications, etc.

The cloud computing architecture of system 100 includes common access points 132. Common access points 132 multiplex multiple customers, VPNs, VLANs, applications, and other network traffic channels accessing a networking device (e.g., router, switch, VPN PE device, etc.). For example, common access point 132-$f$ on VPN PE device 116 multiplexes dozens of VLANs and users/applications. In another example, common access point 132-$i$ on networking device 128 multiplexes thousands of customers, VPNs, VLANs, applications, etc.

Figure 2:
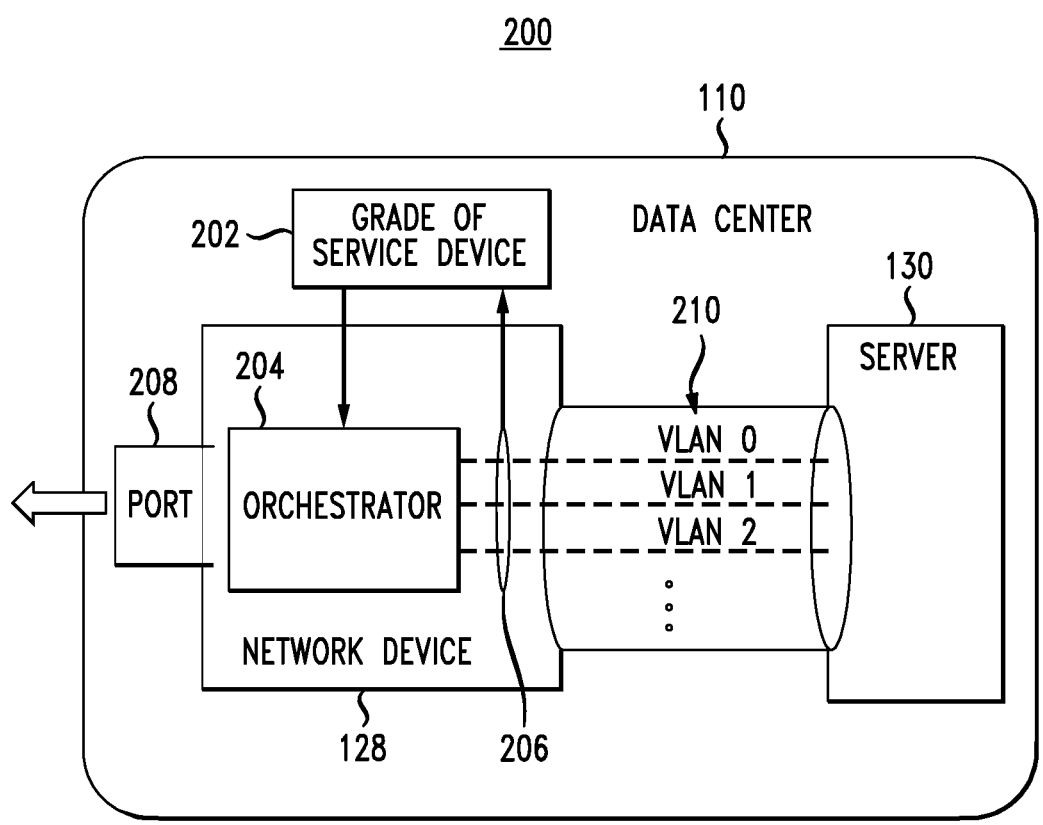
FIG. 2 shows a block diagram of a system for managing network traffic, in accordance with one or more embodiments.

FIG. 2 shows a block diagram of a system 200 for implementing Grade of Service (GoS) to, e.g., manage network traffic on a common access point 132. System 200 is illustratively shown implementing grade of service on common access point 132-*i* of the data center 110. However, it should be understood that system 200 may implement GoS on any common access point, such as, e.g., common access points 132-*a* on internet-based site 104, common access points 132-*b* on customer A VPN site 106, common access points 132-*c* on customer B VPN site 108, common access points 132-*d* on internet AR 112, common access points 132-*e* on VPN PE 114, common access points 132-*f* on VPN PE 116, common access points 132-*g* on Extranet VPN 124, common access points 132-*h* on Extranet VPN 126. Other implementations of system 200 are also contemplated. System 200 includes GoS device 202, which allows for a closed loop mechanism between GoS mechanisms implemented in hardware on a network device and GoS decision software implemented in, e.g., VMware on GoS device 202. GoS device 202 thus allows the complexity of GoS to be moved from hardware to software-based mechanisms, decorrelating the data path from the control path.

GoS device 202 receives network traffic information 206 from network device 128 for network traffic channels 210. Network traffic channels 210 are shown in FIG. 2 as VLANs, but may also include ports, local area networks (LANs), VPNs, applications, etc. In one embodiment, network traffic channels 210 include anything (e.g., functions, protocols, services, etc.) from layer 3 (network layer) to layer 7 (application layer). The network device 128 polls network traffic channels 210 to measure traffic entering network device 128. In one embodiment, the network device 128 polls network traffic channels 210 at regular, predefined intervals of time. For example, polling may be performed every few minutes (e.g., once per minute, every 3 minutes, etc.). In another embodiment, polling may be performed a single time. In other embodiments, the network device 128 polls network traffic channel 210 in response to an event, such as, e.g., a network event where a threshold is reached in a queue, a packet is discarded, etc.

GoS device 202 receives network traffic information 206 from network device 128 and analyzes network traffic information 206 to determine a behavior value associated with each network traffic channel 210. GoS device 202 defines the notion of compliant/non-compliant according to network traffic channel 210 (e.g., port, LAN, VPN, application). As such, there is no longer an assessment and differentiation of treatment per packet, but rather a differentiation of treatment per network traffic channel 210 (e.g., per application, per flow, per VPN, etc.). In one embodiment, GoS device 202 analyzes network traffic information 206 at the virtual machine (VM) level. Implementing this function at the VM level allows several improvements, such as, e.g., the usage of complex algorithms, which can be more flexible, efficient and powerful than the current hardware capabilities. The VM is not linked to the hardware, so it can be shared between multiple hardware elements. In addition, the hardware could also be cheaper as less complexity is needed on the operating system. It should be understood that while the functionality of GoS device 202 is shown separate from that of network device 128, GoS device 202 may be implemented as a separate, discrete component or may be integrated with another component, e.g., network device 128. Further details of GoS device 202 will be discussed below with respect to FIGS. 3 and 4.

Orchestrator 204 provides network or service orchestration to map each network traffic channel 210 to a grade of service based on the behavior value from GoS device 202. Orchestrator 204 may be included in GoS device 202, the network device 128, or may be a separate, discrete component. Initially, all network traffic channels 210 are mapped as being "good behavior." Based on the behavior value, network traffic channels 210 may be modified (e.g., moving it to a lower or higher grade of service, increasing the port available bandwidth, dropping traffic, etc.). In one embodiment, orchestrator 204 maps network traffic channels 210 to a grade of service by changing an experimental bit field EXP in the multiprotocol label switching (MPLS) header in accordance with the behavior value for all traffic in that network traffic channel 210. For example, traffic channels may be mapped to a grade of service by changing the EXP field to EXP 3. In another embodiment, network traffic channels 210 are mapped to a grade of service by changing the differentiated services (DSCP) in the internet protocol (IP) header in accordance with the behavior value for all traffic in that network traffic channel 210. For example, the DSCP field can be changed from DSCP 34 (i.e., low drop/high priority) to DSCP 38 (i.e., high drop/high priority). Other approaches for indicating a grade of service may also be employed.

Based on the grade of service of the network traffic channels 210, network device 128 transmits the data. The network device 128 provides port level grade of service. Queues are provided for each port of the network device 128. In one embodiment, one or two queues are provided for each port. The queues queue traffic before transmitting on the physical port or line. Each queue includes one or more discard thresholds to discard traffic based on the grade of service. For example, if traffic utilizes greater than 100% of the contracted bandwidth, traffic with a grade of service of EXP 3 or worse is discarded.

System 200 provides a per network traffic channel differentiation of treatment. If GoS device 202 determines that network traffic information 206 for a particular network traffic channel 210 (e.g., VPN, application, etc.) is non-compliant or not well behaving, then orchestrator 204 reconfigures the hardware of network device 128 to move the whole network traffic channel 210 into a non-complaint grade, moving de facto all the packets from this network traffic channel 210 from "priority 1" to "priority 2" to thereby induce a higher probability for it to be discarded. In this manner, other applications are protected if they behave well. Advantageously, this GoS implementation is done by bringing all the complexity to the GoS device 202.

Figure 3:
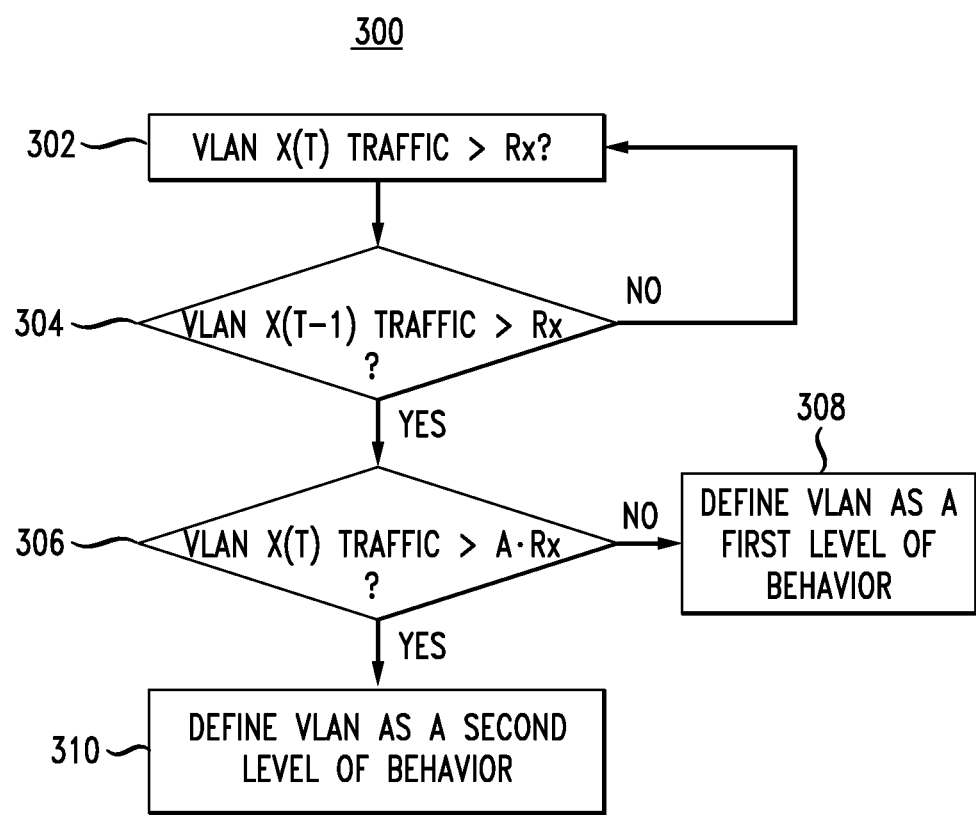
FIG. 3 shows a flow diagram of a method for determining a behavior value for network traffic channels polled at regular intervals, in accordance with one or more embodiments.

FIG. 3 shows a flow diagram of an illustrative method 300 for determining a behavior value for network traffic channels 210 polled at regular intervals. Method 300 may be implemented by GoS device 202 in one embodiment. It should be understood that while method 300 will be discussed with respect to system 200, method 300 may be implemented for any system or configuration.

At step 302, network traffic information 206 for VLAN X, at current time T is compared to a threshold Rx. For example, it is determined whether traffic at VLAN X at current time T is greater than the threshold Rx, which is shown as VLAN X(T) traffic>Rx in step 302. VLAN X represents a VLAN on network device 128, but may also include other network traffic channels 210, e.g., ports, LANs, VPNs, applications, etc. Network traffic information 206 is a result of polling of network traffic channels 210. Polling may be performed at regular, predefined intervals (e.g., every few minutes) by network device 128 to provide network traffic information 206. The threshold Rx may include any user defined threshold. For example, the threshold Rx may be 10 megabits per second (Mbps). In one embodiment, the threshold Rx is 20% of the maximum contracted bandwidth. Other criteria may also be employed.

At step 304, where network traffic information 206 for VLAN X at current time T is greater than the threshold Rx, network traffic information 206 for VLAN X at time (T−1) is compared to the threshold Rx. Time (T−1) represents the time immediately prior to current time T. For example, where network traffic information 206 for VLAN X at current time T is greater than the threshold Rx, it is determined whether traffic at VLAN X at prior time (T−1) is greater than the threshold Rx, which is shown as VLAN X(T−1) traffic>Rx in step 304. This allows method 300 to wait at least Y non-compliant polling iterations before downgrading VLAN X. It should be understood that while method 300 illustratively depicts Y=2 iterations, Y may represent any positive integer. For example, method 300 may include Y=3 iterations by comparing network traffic information 206 for VLAN X at prior time (T−2) to the threshold Rx. In one embodiment, Y is between 5 and 10 iterations.

At step 306, where network traffic information 206 for VLAN X at prior time (T−1) is greater than the threshold Rx (or another prior time according to the number of iterations Y), network traffic information 206 for VLAN X at current time T is compared to a second threshold (A·Rx), where A is any positive value. For example, where network traffic information 206 for VLAN X at time (T−1) is greater than the threshold Rx, it is determined whether traffic at VLAN X at current time T is greater than the second threshold (A·Rx), which is shown as VLAN X(T) traffic>(A·Rx) in step 306. In one embodiment, A is any positive value greater than one such that the second threshold (A·Rx) is larger that threshold Rx. In one embodiment, A is 2. While method 300 employs two thresholds, threshold Rx and second threshold (A·Rx), to provide two behavior values, it should be noted that method 300 may employ more or less thresholds to provide more or less behavior values. In one embodiment, for example where type of service is employed, method 300 employs up to 8 thresholds to provide up to eight behavior values (i.e., eight Grades of Services). In another embodiment, for example where DSCP is employed, 6 bits are used to qualify the grade of service, leading to more possible grades of services (i.e., up to 720 combinations), and thus method 300 employs up to 720 thresholds.

At step 308, where network traffic information 206 for VLAN X at current time T is not greater than second threshold (A·Rx), but is greater than first threshold Rx), VLAN X is associated with a first behavior value defining a first level of behavior. As discussed above, the behavior value will be mapped to each network traffic channel 210, which will be used to determine a grade of service for discarding traffic by the network device 128. For example, the behavior value may indicate "bad behavior." In one embodiment, the behavior value will be a non-negative integer value.

At step 310, where network traffic information 206 for VLAN X at current time T is greater than second threshold (A·Rx), VLAN X is associated with a second behavior value defining a second level of behavior (i.e., worse behavior than at the first level of behavior in step 308). For example, the behavior value may indicate "BE behavior" (i.e., Best Effort behavior). As noted above, the behavior value will be a non-negative integer value in one embodiment.

Figure 4:
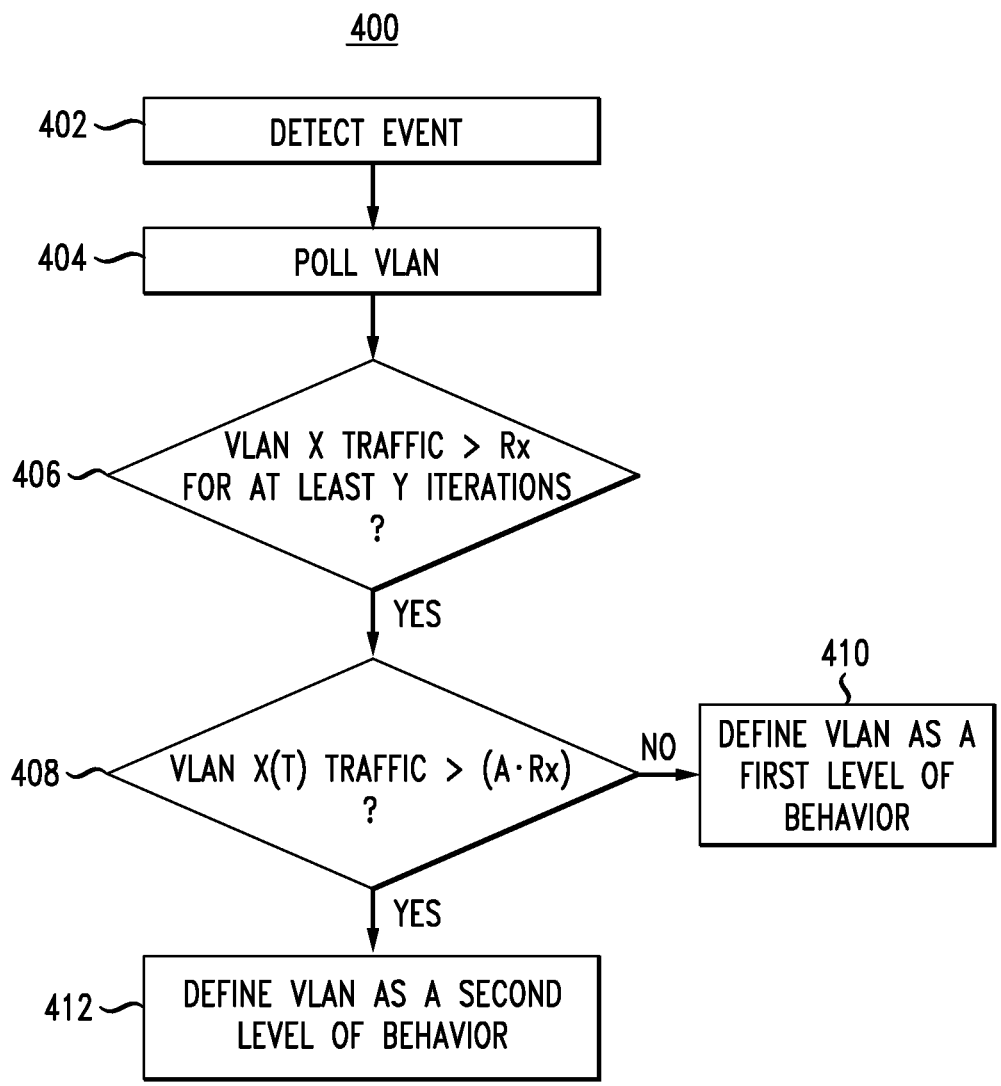
FIG. 4 shows a flow diagram of a method for determining a behavior value for network traffic channels polled in response to an event, in accordance with one or more embodiments.

FIG. 4 shows a flow diagram of an illustrative method 400 for determining a behavior value for network traffic channels 210 polled in response to an event. Method 400 may be implemented by GoS device 202 in one embodiment. It should be understood that while method 400 will be discussed with respect to system 200, method 400 may be implemented for any system or configuration.

At step 402, an event is detected. The event includes a network congestion event. The event can be detected by smart/generic framing procedures (GFP) alarm systems and sent to a network management system. In one embodiment, the event includes a packet discard, a threshold reached in a queue (e.g., in networking device 128), a link failure event, a routing event, etc. Other events are also contemplated.

At step 404, in response to the event being detected, VLANs are polled for network traffic information 206. VLANs represent VLANs on network device 128, but may also include any network traffic channel 210. The polling may be performed for a user determined number of times (e.g., once, three times) or at a regular interval for a user determined period of time (e.g., once per minute for five minutes). In one embodiment, polling is performed at regular, user defined intervals, in addition to being triggered by the event.

At step 406, network traffic information 206 for VLAN X is compared to a threshold Rx. For example, it is determined whether traffic at VLAN X is greater than the threshold Rx, which is shown as VLAN X traffic>Rx in step 406. This comparison may be performed for Y iterations, where Y is any positive integer. For example, for Y=3 iterations, network traffic information 206 for VLAN X is compared to the threshold Rx at current time T, time (T−1), and time (T−2). This ensures at least Y "bad" polling iterations before downgrading network traffic channels 210. The threshold may include any user defined threshold (e.g., 20% of the maximum contracted bandwidth).

At step 408, where network traffic information 206 for VLAN X is greater than the threshold Rx for Y intervals, network traffic information 206 for VLAN X at current time T is compared to a second threshold (A·Rx), where A is any positive value. For example, where network traffic information 206 for VLAN X is greater than the threshold Rx for Y intervals, it is determined whether traffic at VLAN X at current time T is greater than the second threshold (A·Rx), which is shown as VLAN X(T) traffic>(A·Rx) in step 408. In one embodiment, A is any positive value greater than one such that the second threshold (A·Rx) is larger that threshold Rx (e.g., A=2). While method 400 employs two thresholds, threshold Rx and second threshold (A·Rx), to provide two behavior values, it should be noted that method 400 may employ more or less thresholds to provide more or less behavior values (e.g., up to 8 thresholds).

At step 410, where network traffic information 206 for VLAN X at current time T is not greater than second threshold (A·Rx), but is greater than first threshold Rx, VLAN X is associated with a first behavior value defining a first level of behavior (e.g., "bad behavior").

At step 412, where network traffic information 206 for VLAN X at current time T is greater than second threshold (A·Rx), VLAN X is associated with a second behavior value defining a second level of behavior (e.g., "BE behavior"). In one embodiment, the behavior values will be a non-negative integer value.

Advantageously, GoS orchestrated changes are triggered by an event in method 400, which allows the network device 128 to maintain full queuing capabilities if there is no congestion detected and limit packet discard. In one embodiment, the event driven method 400 is coupled with method 300 to provide an optimized behavior, where network traffic channels 210 are only modified (e.g., downgraded) when congestion occurs or is close to occurring.

Figure 5:
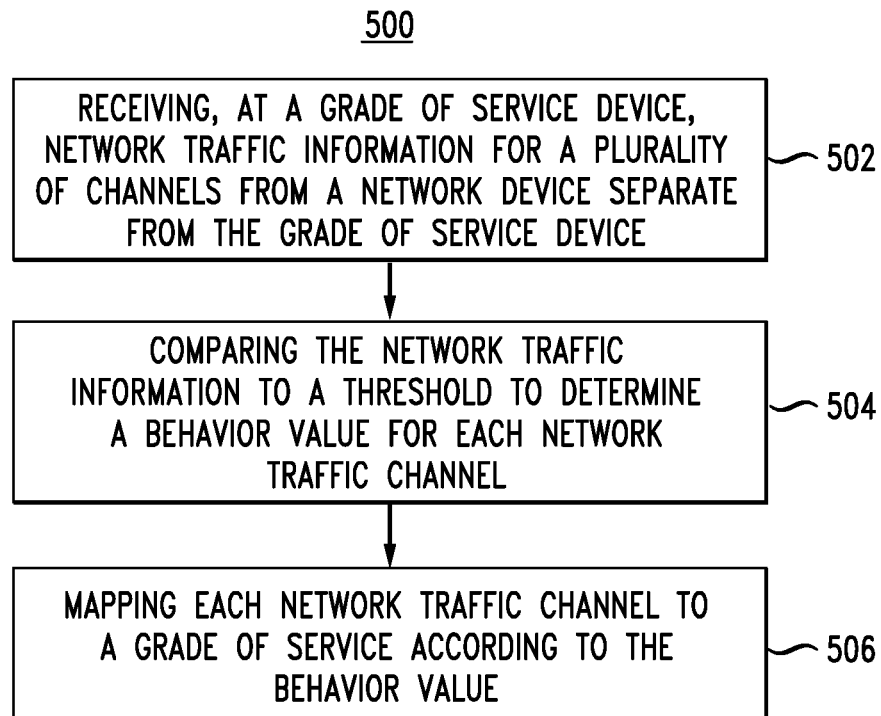
FIG. 5 shows a flow diagram showing a method for managing network traffic, in accordance with one or more embodiments.

FIG. 5 shows a flow diagram showing a method 500 for managing network traffic in accordance with one embodiment. Method 500 can be used to implement grade of service for a network device. In one embodiment, GoS device 202 implements the steps of method 500.

At step 502, network traffic information is received from a network device, at a grade of service device, for a plurality of network traffic channels. The network traffic channels may include, e.g., VLANs, VPNs, applications, etc. The network traffic channels are polled by the network device to provide the network traffic information to the grade of service device. The grade of service device is separate from the network device. Grade of service is thereby implemented at the VM level of the grade of service device, moving the complexity away from hardware of the network device. Grade of service is implemented at the hardware level using elementary mechanism, such as forwarding, queuing, and drop/discarding. The flow itself remains on the hardware, and only the characterization of the flow is implemented at the VM level (of GoS device 202)

In one embodiment, network traffic information is received from the network device at a regular time interval (e.g., once a minute). In another embodiment, network traffic information is received from the network device in response to a network event. The network event may include, e.g., a threshold reached in a queue or a packet discard. In some embodiments, network traffic information may be received at a regular time interval and in response to a network event to provide an optimized behavior, e.g., where a network traffic channel is only downgraded when congestion occurs or is close to occurring.

At step 504, the network traffic information is compared to a threshold to determine a behavior value for each network traffic channel. In one embodiment, the threshold is specified by the user. For example, the threshold may include a bandwidth amount, e.g., 10 Mbps, or a percentage of use, e.g., 20% of contracted maximum bandwidth. The behavior value may be a non-negative integer value, e.g., 3. In some embodiments, the network traffic information is compared to a threshold for one or more previous time periods. For example, in one embodiment, the user indicates the number of iterations Y to compare network traffic information for a previous time period to the threshold. This allows method 500 to wait at least Y "bad" polling iterations before downgrading a network traffic channel.

At step 506, each network traffic channel is mapped to a grade of service according to the behavior value. In this manner, grade of service is not implemented on a per packet basis, but rather per network traffic channel (e.g., per application, per VPN, per VLAN, etc.). This moves all packets in the network traffic channel to a lower grade of service, inducing a higher probability for it to be discarded. Doing this, other applications are protected if they behave correctly.

In one embodiment, mapping each network traffic channel includes changing an EXP field in an MPLS header. For example, the EXP field may be updated to EXP 3 to indicate its grade of service. In another embodiment, mapping each network traffic channel includes changing the DSCP field in an IP header. Other approaches to indicate a grade of service may also be employed.

The network device sends the network traffic according to its grade of service. The network device includes a port level grade of service. For each port, one or more queues are provided to queue traffic before transmitting on the physical line or port. Each queue may include one or more discard thresholds to discard traffic based on its grade of service. For example, the threshold may indicate that where traffic is greater than 100, traffic with a grade of service of EXP 3 or worse is discarded.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIGS. 3-5. Certain steps of the methods described herein, including one or more of the steps of FIGS. 3-5, may be performed by a server or by another processor in a network-based cloud-computing system. Certain steps of the methods described herein, including one or more of the steps of FIGS. 3-5, may be performed by a client computer in a network-based cloud computing system. The steps of the methods described herein, including one or more of the steps of FIGS. 3-5, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 3-5, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
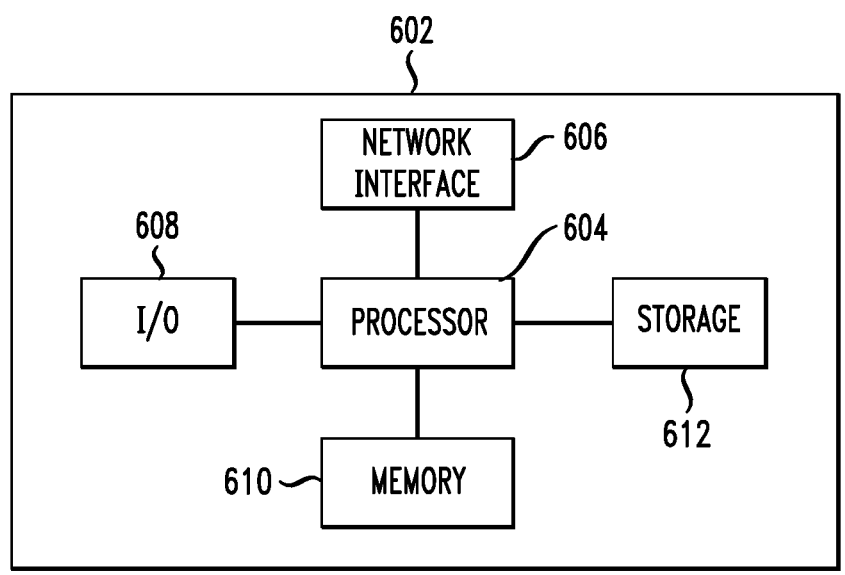
FIG. 6 depicts a high-level block diagram of a computer for managing network traffic, in accordance with one or more embodiments.

A high-level block diagram of an example computer that may be used to implement systems, apparatus, and methods described herein is depicted in FIG. 6. Computer 602 includes a processor 604 operatively coupled to a data storage device 612 and a memory 610. Processor 604 controls the overall operation of computer 602 by executing computer program instructions that define such operations. The computer program instructions may be stored in data storage device 612, or other computer readable medium, and loaded into memory 610 when execution of the computer program instructions is desired. Thus, the method steps of FIG. 6 can be defined by the computer program instructions stored in memory 610 and/or data storage device 612 and controlled by processor 604 executing the computer program instructions. For example, the computer program instructions can be implemented as computer executable code programmed by one skilled in the art to perform the method steps of FIG. 6. Accordingly, by executing the computer program instructions, the processor 604 executes the method steps of FIGS. 3-5. Computer 602 also includes one or more network interfaces 606 for communicating with other devices via a network. Computer 602 also includes one or more input/output devices 608 that enable user interaction with computer 602 (e.g., display, keyboard, mouse, speakers, buttons, etc.).

Processor 604 may include both general and special purpose microprocessors, and may be the sole processor or one of multiple processors of computer 602. Processor 604 may include one or more central processing units (CPUs), for example. Processor 604, data storage device 612, and/or memory 610 may include, be supplemented by, or incorporated in, one or more application-specific integrated circuits (ASICs) and/or one or more field programmable gate arrays (FPGAs).

Data storage device 612 and memory 610 each include a tangible non-transitory computer readable storage medium. Data storage device 612, and memory 610, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 608 may include peripherals, such as a printer, scanner, display screen, etc. For example, input/output devices 608 may include a display device such as a cathode ray tube (CRT) or liquid crystal display (LCD) monitor for displaying information to the user, a keyboard, and a pointing device such as a mouse or a trackball by which the user can provide input to computer 602.

Any or all of the systems and apparatus discussed herein, including system 200, may be implemented using one or more computers such as computer 602.

One skilled in the art will recognize that an implementation of an actual computer or computer system may have other structures and may contain other components as well, and that FIG. 6 is a high level representation of some of the components of such a computer for illustrative purposes.

The foregoing Detailed Description is to be understood as being in every respect illustrative and exemplary, but not restrictive, and the scope of the disclosure described herein is not to be determined from the Detailed Description, but rather from the claims as interpreted according to the full breadth permitted by the patent laws. It is to be understood that the embodiments shown and described herein are only illustrative of the principles of the present disclosure and that various modifications may be implemented by those skilled in the art without departing from the scope and spirit of the disclosure. Those skilled in the art could implement various other feature combinations without departing from the scope and spirit of the disclosure.

The invention claimed is:

1. A method for managing network traffic, comprising:
receiving, by a processing system including a processor, network traffic information for a network traffic channel at a first iteration and a second iteration consecutive to the first iteration, wherein the network traffic information comprises a measure of traffic on the network traffic channel;
comparing, by the processing system, the network traffic information received at the first iteration and the second iteration with an initial traffic threshold; and
in response to determining that the network traffic information received at the first iteration and the second iteration is greater than the initial traffic threshold:
  determining, by the processing system, a behavior value of a plurality of behavior values for the network traffic channel by comparing the network traffic information received at the second iteration with one or more additional traffic thresholds, wherein each of the one or more additional traffic thresholds corresponds to a measure of traffic greater than that corresponding to the initial traffic threshold, wherein each of the initial traffic threshold and the one or more additional traffic thresholds respectively corresponds to one of the plurality of behavior values, and
  associating, by the processing system, the network traffic channel with a grade of service of a plurality of grades of service according to the behavior value, wherein each of the plurality of grades of service corresponds respectively to one of the plurality of behavior values and indicates a discard threshold.

2. The method of claim 1, wherein the initial traffic threshold is based on a maximum bandwidth of the network traffic channel.

3. The method of claim 1, wherein the network traffic information comprises a measure of traffic entering a network device from the network traffic channel.

4. The method of claim 1, wherein receiving network traffic information for a network traffic channel at a first iteration and a second iteration consecutive to the first iteration comprises: receiving the network traffic information for the network traffic channel at the first iteration and the second iteration according to a predefined interval of time.

5. The method of claim 1, wherein receiving network traffic information for a network traffic channel at a first iteration and a second iteration consecutive to the first iteration comprises: receiving the network traffic information for the network traffic channel at the first iteration and the second iteration in response to a network event.

6. The method of claim 5, wherein the network event comprises at least one of a queue threshold reached in a queue of a network device, a packet discard, a link failure, and a routing event.

7. The method of claim 1, further comprising: discarding traffic in the network traffic channel based on the grade of service.

8. The method of claim 1, wherein associating the network traffic channel with a grade of service according to the behavior value comprises: setting an experimental bit field in a multiprotocol label switching header of all packets of the network traffic channel based on the behavior value.

9. The method of claim 1, wherein associating the network traffic channel with a grade of service according to the behavior value comprises: setting a differentiated services field in an internet protocol header of all packets of the network traffic channel based on the behavior value.

10. A non-transitory computer readable medium storing computer program instructions for managing network traffic, which, when executed on a processor, cause the processor to perform operations comprising:
receiving network traffic information for a network traffic channel at a first iteration and a second iteration consecutive to the first iteration, wherein the network traffic information comprises a measure of traffic on the network traffic channel;
comparing the network traffic information received at the first iteration and the second iteration with an initial traffic threshold; and
in response to determining that the network traffic information received at the first iteration and the second iteration is greater than the initial traffic threshold:
determining a behavior value of a plurality of behavior values for the network traffic channel by comparing the network traffic information received at the second iteration with one or more additional traffic thresholds, wherein each of the one or more additional traffic thresholds corresponds to a measure of traffic greater than that corresponding to the initial traffic threshold, wherein each of the initial traffic threshold and the one or more additional traffic thresholds respectively corresponds to one of the plurality of behavior values, and
associating the network traffic channel with a grade of service of a plurality of grades of service according to the behavior value, wherein each of the plurality of grades of service corresponds respectively to one of the plurality of behavior values and indicates a discard threshold.

11. The non-transitory computer readable medium of claim 10, wherein the initial traffic threshold is based on a maximum bandwidth of the network traffic channel.

12. The non-transitory computer readable medium of claim 10, wherein the network traffic information comprises a measure of traffic entering a network device from the network traffic channel.

13. The non-transitory computer readable medium of claim 10, wherein receiving network traffic information for a network traffic channel at a first iteration and a second iteration consecutive to the first iteration comprises: receiving the network traffic information for the network traffic channel at the first iteration and the second iteration according to a predefined interval of time.

14. The non-transitory computer readable medium of claim 10, wherein receiving network traffic information for a network traffic channel at a first iteration and a second iteration consecutive to the first iteration comprises: receiving the network traffic information for the network traffic channel at the first iteration and the second iteration in response to a network event.

15. An apparatus for managing network traffic comprising:
a processor; and
a memory to store computer program instructions, the computer program instructions when executed on the processor cause the processor to perform operations comprising:
receiving network traffic information for a network traffic channel at a first iteration and a second iteration consecutive to the first iteration, wherein the network traffic information comprises a measure of traffic on the network traffic channel;
comparing the network traffic information received at the first iteration and the second iteration with an initial traffic threshold; and
in response to determining that the network traffic information received at the first iteration and the second iteration is greater than the initial traffic threshold:
determining a behavior value of a plurality of behavior values for the network traffic channel by comparing the network traffic information received at the second iteration with one or more additional traffic thresholds, wherein each of the one or more additional traffic thresholds corresponds to a measure of traffic greater than that corresponding to the initial traffic threshold, wherein each of the initial traffic threshold and the one or more additional traffic thresholds respectively corresponds to one of the plurality of behavior values, and
associating the network traffic channel with a grade of service of a plurality of grades of service according to the behavior value, wherein each of the plurality of grades of service corresponds respectively to one of the plurality of behavior values and indicates a discard threshold.

16. The apparatus of claim 15, wherein receiving network traffic information for a network traffic channel at a first iteration and a second iteration consecutive to the first iteration comprises: receiving the network traffic information for the network traffic channel at the first iteration and the second iteration in response to a network event.

17. The apparatus of claim 16, wherein the network event comprises at least one of a queue threshold reached in a queue of a network device, a packet discard, a link failure, and a routing event.

18. The apparatus of claim 15, the operations further comprising: discarding traffic in the network traffic channel based on the grade of service.

19. The apparatus of claim 15, wherein associating the network traffic channel with a grade of service according to the behavior value comprises: setting an experimental bit field in a multiprotocol label switching header of all packets of the network traffic channel based on the behavior value.

20. The apparatus of claim 15, wherein associating the network traffic channel with a grade of service according to the behavior value comprises: setting a differentiated services field in an internet protocol header of all packets of the network traffic channel based on the behavior value.

* * * * *